Nov. 20, 1956  A. J. NORMAN  2,770,930
TOOL REST FOR USE IN GRINDING MILLING CUTTERS
Filed Jan. 15, 1954
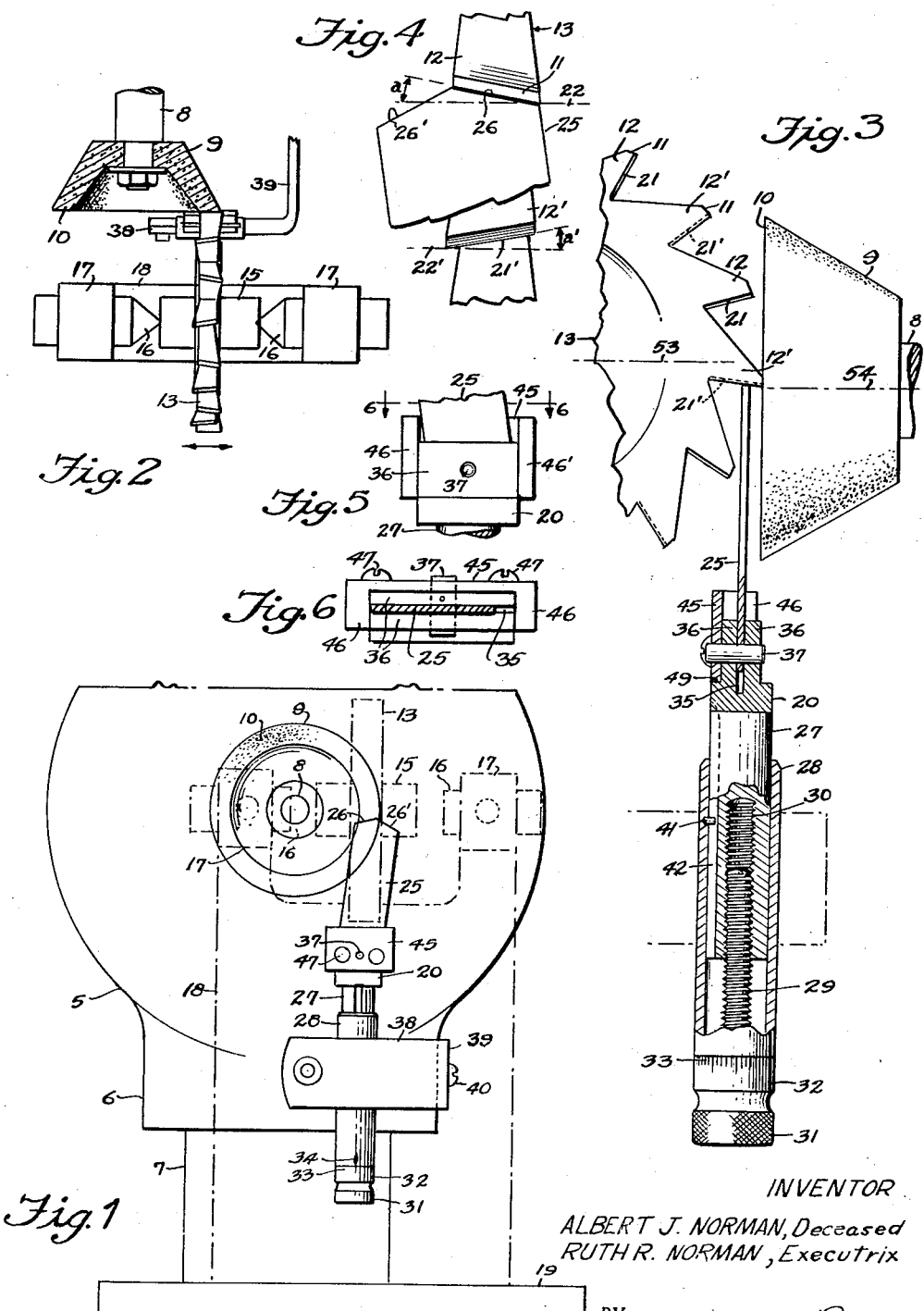
INVENTOR
ALBERT J. NORMAN, Deceased
RUTH R. NORMAN, Executrix
BY Lynn H Latta
—ATTORNEY—

United States Patent Office 2,770,930
Patented Nov. 20, 1956

2,770,930

TOOL REST FOR USE IN GRINDING MILLING CUTTERS

Albert J. Norman, deceased, late of Santa Monica, Calif., by Ruth R. Norman, executrix, Venice, Calif.

Application January 15, 1954, Serial No. 404,214

6 Claims. (Cl. 51—225)

This invention relates to the art of sharpening the teeth of milling cutters. The general object of the invention is to provide an improved tool rest for guiding the teeth of a milling cutter against a grinding wheel so as to accurately sharpen the cutter teeth at the proper angle.

The invention deals particularly with the grinding of a milling cutter in a set-up wherein the cutter is securely mounted on a fixed axis located at a predetermined distance from the face of the grinding wheel (corresponding substantially to the radius of the cutter tooth tip) and so disposed with reference to the axis of rotation of the grinding wheel, that each successive cutter tooth may have its tip presented to the face of the grinding wheel in a proper position for grinding the tip at the proper angle of relief.

An important object of the invention is to provide a tool rest which affords a swinging support for a cutter tooth such as to provide individual supporting surfaces for alternate teeth of the cutter, each of the supporting surfaces conforming to the inclination of a forward face of a respective tooth, in a manner to provide a support which may be engaged by said forward tooth face throughout the full width thereof.

Another object is to provide such a tool rest which affords a quick shift from one supporting surface to another and vice versa, so as to reduce to a minimum the time interval of transition between successive grinding steps.

A further object is to provide a tool rest which, in combination with the above described rotatable mounting of the cutter on a fixed axis, will afford continued support for the cutter tooth while the latter is shifted axially from a position in full contact with the face of the grinding wheel to a position out of contact therewith, and vice versa. Thus the invention makes it possible to shift the cutter into and out of contact with the grinding wheel without the risk of having the tooth shift to an improper angular relation to the grinding wheel, during the shift.

Other objects will become apparent in the ensuing specifications and appended drawings in which:

Fig. 1 is a front elevation of a milling cutter grinding set-up embodying the tool rest of the invention;

Fig. 2 is a horizontal sectional view of the grinding wheel and a plan view of the cutter and cutter supporting set-up;

Fig. 3 is a side elevation of the grinding wheel and cutter, including a view of the tool rest partially in side elevation and partially in axial section;

Fig. 4 is a fragmentary detail rear elevational view of portions of the tool rest and cutter teeth associated therewith;

Fig. 5 is a fragmentary rear view of the tool rest, showing the mounting head thereof; and Fig. 6 is a horizontal sectional view taken on the line 6—6 of Fig. 5.

Referring now to the drawing in detail, there is shown in Fig. 1, a conventional grinder apparatus including an electric motor 5 having a base 6 mounted upon a supporting pedestal 7 and having a shaft 8 which carries a grinding wheel 9 of frustro-conical form, with a flat annular grinding face 10 disposed in a plane normal to the axis of shaft 8. Thus a face grinding operation, in an area having a width corresponding roughly to the radial width of grinding face 10, may be performed. This width of the grinding area will normally correspond roughly to the axial width of the tips 11, 11' of teeth 12, 12' of a milling cutter 13.

For accurate positioning of the cutter teeth, the cutter 13 is mounted upon a cylindrical arbor 15 which in turn is mounted between tail stocks 16 supported by axially spaced bearings 17. The cutter 13 may be shifted axially on arbor 15 from a position in which the tips 11 of its teeth register with the grinding path of grinding wheel face 10, to a position shifted (radially with reference to the rotational axis of grinding wheel 9) out of registration with said grinding path. Bearings 17 may constitute portions of a mounting bracket 18 rising from the bed 19 of the grinder apparatus. Since such supporting mechanism is conventional, it is shown merely in outline form. Furthermore, in order to better illustrate the tool rest of my invention, which, in Fig. 1, would be otherwise obscured by the above described cutter mounting, the cutter and cutter mounting, in Fig. 1, are shown in phantom.

The forward faces 21, 21' of cutter teeth 12, 12' are, as indicated most clearly in Fig. 4, disposed in planes which are inclined at a small angle with reference to adjacent radial planes of the cutter axis (in Fig. 4 the lines 22 and 22' for alternate teeth, being indicative of such planes, since they are lines that lie in such radial planes at the leading corners of respective cutter teeth 12, 12', as supported by the improved tool rest). This angle of inclination, for alternate teeth, is indicated respectively at $a$ and $a'$ in Fig. 4.

As previously indicated, a major object of the invention is to provide full width support for the alternate teeth 12, 12', of the cutter, while the teeth are properly positioned for grinding. To this end, the invention provides a tool rest including a tooth supporting blade 25 having a free end defined by a pair of end faces 26, 26' which are inclined, with respect to a line normal to the longitudinal axis of the blade 25, at angles somewhat greater than the angles $a$ and $a'$ of inclination of teeth 12, 12'. The end faces 26, 26' intersect at the central longitudinal axis of blade 25, and are inclined symmetrically with respect to the aforesaid central blade axis.

The blade is supported by a mounting head 20 having an integral cylindrical shank 27 which is telescoped in a mounting sleeve 28 for axial adjustment in response to operation of an adjustment screw 29 threaded into an internally threaded bore 30 in the lower portion thereof. Adjustment screw 29 has a knurled head 31 including a dial face portion 32 having scale marks 33 thereon for cooperation with an indicator mark 34 (Fig. 1) on the lower end of the sleeve 28, thus to indicate the degree of adjustment.

Mounting head 20 is provided with a slot 35 disposed in a plane parallel to its forward face and defined between furcations 36 of rectangular marginal contour, the slots 35 extending through both sides of the head 20. The lower end of blade 25 is received in slot 35 and is snugly embraced between the furcations 36 so as to be securely supported in a plane which may be disposed parallel to the grinding face 10 of wheel 9. Blade 25 is mounted upon a pivot pin 37 which extends through aligned openings in furcations 36. Thus the blade 25 is mounted for lateral swinging movement in the above mentioned plane when the tool rest is properly mounted. Such mounting may be provided for by a conventional mounting clamp or vice 38 carried on the end of an arm 39 attached, as at 40, to a side of motor base 6 (or mounted in any other suitable manner). Such mounting will provide for rotational adjustment of sleeve 28 about its own axis, to adjust the blade 25 to a plane of parallelism with grinding face 10 as above specified. With the sleeve 28 thus properly adjusted, the plane of blade 25 will be maintained by a key 41 which is mounted in sleeve 28 and engages in a keyway 42 in the forward side of shank 27.

It will not be apparent that blade 25 may swing upon its pivot 37, in a plane parallel to grinding face 10, from a position wherein an end surface 26 is in the proper position to support a forward face 21 of a tooth 12; to an alternate position wherein an end face 26' is in a proper position to support a forward face 21' of a tooth 12'.

These alternate positions of blade 25 are determined by limiting the swinging movement thereof on respective sides of a vertical median line passing through pivots 37. This is provided for by a channel shaped stop member 45 having respective side flanges 46, 46' for engagement by the respective sides of blade 25. Stop member 45 is secured to mounting head 26 by a pair of screws 47, and is accurately positioned thereon by the engagement of the inner walls of flanges 46 against the respective sides of furcations 36. It is also positioned by engagement of the lower edge of its central web portion against a shoulder 49 on mounting head 20, at the base of a furcation 36.

In the operation of the improved tool rest, the cutter 13 is slipped over an arbor 15, selected to snugly fit the hub bore of the cutter, and the arbor 15 is then mounted between tail stocks 16 which are secured in positions of proper spacing to provide for free rotation of arbor 15 while securely supporting it for rotation on a fixed axis. The bracket 18 may then be adjusted on bed 19 to bring the cutter 13 into proper registry with the grinding face 10 of wheel 9. In this connection it will be understood that any conventional means for adjustable mounting of bracket 18 on bed 19 may be utilized, the height of bracket 18 being such as to dispose the axis of tail stocks 16 near (but preferably slightly above) the level of the rotational axis of wheel 9 so that the teeth tips 11 may ground with a suitable angle of relief. This is attained by providing for supporting the teeth at a level somewhat below that of the cutter axis, indicated at 53 in Fig. 3. in which case, the preferable arrangement would be to have the cutter axis 53 disposed somewhat above the level of the axis of grinding wheel 9, indicated by line 54 in Fig. 3, and the upper end of blade 25 would in this case be so positioned as to bring the respective end surfaces 26, 26' thereof to approximately the level of axis 54 as indicated in Fig. 3. In any event, the level of the upper end faces 26, 26' would be somewhat below the level of cutter axis 53, so as to provide for the proper angle of relief in grinding the tips 11.

With the bracket 18 adjusted to a position to properly locate the axis of cutter 13 with reference to grinding wheel 9, the tool rest unit may then be adjusted to the proper height to meet the above stated requirements for determining the height of a tooth for grinding.

This adjustment is of course accomplished by rotating knob 31. In this connection, it may be pointed out that the initial mounting of sleeve 28 in supporting vice 38 may be so adjusted as to locate the upper end of blade 25 at the level of cutter axis 53 when shank 27 is in a position of maximum extension, or any position of extension such that a zero reading appears upon scale 33. Consequently, the exact amount of offset of the upper end of blade 25 below the level of cutter 53 may be read directly upon scale 33, and the proper vertical position of a tooth 12 or 12' for grinding may thus be located with extreme accuracy in accordance with any predetermined formula relating to the proper depression of the tooth below the level of axis 53.

With the tool rest properly located, the matter of grinding the consecutive cutter teeth becomes very simple, substantially eliminating human error. For grinding a tooth 12, the blade 25 will be shifted to a position in which the forward face 21 of the tooth may rest against an end face 26 of the blade. For grinding a tooth 12', the blade will be shifted to the alternate position in which an end face 26' is positioned for engagement by a forward face 21' of a tooth 12'.

Assuming that the grinding starts with a tooth 12, the cutter may be shifted axially back and forth on supporting blade end face 26 (while the blade remains stationary) so as to assure uniform grinding of the tooth throughout its width. The downward pressure of a tooth against the upper end of the blade while it is in either tilted position, will prevent the blade tilting toward the alternate position under the drag of a cutter tooth sliding on end face 26 or 26'.

In shifting between the respective grinding positions, the cutter 13 is slid axially upon its mounting arbor 15 while the tooth that has just been ground may be maintained in contact with the upper end of blade 25, the blade 25 remaining stationary so that the cutter tooth will slide off the tooth supporting upper end thereof. Such shifting, after grinding of a tooth 12, with the parts in the positions shown in Fig. 1, would be a liftward shift to a point where the tooth 12 that has just been ground, will clear the left side of the blade as viewed in Fig. 1, sufficiently to be rotated downwardly past the blade. When the tip 11 of the tooth that has just been ground has thus been moved out of contact with the grinding face 10 of wheel 9, and of blade 25, the cutter 13 may be rotated upon the axis of arbor 15 to bring the next successive tooth into grinding position, without allowing the tip of the tooth to be damaged by continued contact with the grinding wheel. That is to say, as the cutter is rotated to bring the next tooth into grinding position, the cutter teeth are out of registry with the grinding face 10. During the rotation of the cutter, the blade is left in the position that it occupied during the grinding of the preceding tooth, in order to provide a clear path for movement of a succeeding tooth 12' into grinding position. Just before the succeeding tooth reaches the grinding position, the blade is tilted to its alternate position in which the apex portion of the alternate end face 26' is interposed beneath the forward face 21' of the tooth which is now to be ground. The cutter is then shifted rightwardly to bring it again into registry with the grinding face 10, while maintaining contact of tooth face 21' with blade end face 26', whereupon the end face 26' of the blade will provide full width support for the cutter tooth 12'. At the end of this grinding operation the cutter is again moved axially to once more remove it from registry with grinding face 10.

The grinding operation will commence as the blade supported tooth is moved laterally into registry with grinding face 10 and will be completed as the blade supported tooth is finally moved back to a position out of registry with grinding face 10. The slight vertical shift of the tooth during these movements (corresponding to the rise in its inclination from one side to the other) will not materially affect the angle of relief that has been ground on the tooth tip 11.

What is claimed is:

1. In an apparatus for grinding the tips of alternate teeth of a milling cutter wherein the forward faces of such alternate teeth have opposite inclinations with reference to radial planes of the cutter axis, and wherein the cutter is supported for rotation on an axis properly related to the grinding wheel so that the teeth of the cutter may be successively brought, by rotation of the cutter, into positions for proper grinding registry of the teeth tips with the face of a grinding wheel; an improved tool rest for supporting the successive teeth at proper intervals of rotation of the cutter so as to determine a desired angle of relief for the teeth tips as ground by the face of the grinding wheel comprising: a supporting head having means for adjustably mounting the same in a selected position relative to the mounted cutter; a blade having a free end provided with a pair of laterally opposed end faces for respective supporting engagement with the forward faces of alternate cutter teeth and having at its opposite end a pivot connecting it to said supporting head for tilting of the blade in its own plane to alternate positions on respective sides of a vertical median line intersecting said pivot; stop members carried by said supporting head in positions spaced from opposite sides of the median vertical axis of said head extending through said pivot, and engageable by respective sides of said blade for determining respective limit positions of said blade on opposite sides of said median axis, said end faces being inclined at symmetrical acute angles to the central longitudinal axis of the blade and intersecting at said longitudinal axis, the angle of inclination of said end faces being somewhat greater than the angle of inclination of said forward faces of the cutter teeth, whereby in the tilted positions of the blade the angles of inclination of said end faces to the horizontal will correspond to the angles of inclination of said forward faces of the cutter teeth to provide full width support therefor.

2. A tool rest as defined in claim 1, wherein said stop members are included in a channel shaped member having respective side flanges against which the respective sides of said blade are adapted to engage to determine limits for said tilting of the blade to opposite sides of said median line.

3. A tool rest as defined in claim 2, wherein said supporting head includes a pair of furcations defining between them a slot in which said blade is received, said furcations having inner faces snugly embracing the sides of the blade to maintain the blade in a fixed plane in the tilting movement thereof, said pivot extending through the said furcations and through the blade.

4. A tool rest as defined in claim 3, wherein said furcations are of rectangular marginal contour including parallel side faces and wherein the respective side flanges of said channel shaped member have inner walls snugly engaging the said side faces of the furcations to accurately locate said stop member relative to said mounting head.

5. A tool rest as defined in claim 1, wherein said supporting head is provided with a cylindrical shank having a keyway parallel to its axis, said tool rest further including a mounting sleeve in which said shank is telescoped, said sleeve having a key engaged in said keyway to establish a non-rotatable connection between said shank and said sleeve, and an adjusting screw threaded into the inner end of said shank and having a knob engaging the end of said sleeve, said sleeve being adapted to be mounted for both longitudinal and rotational adjustment in a supporting clamp.

6. A tool rest as defined in claim 1, wherein said supporting head is provided with a cylindrical shank having a keyway parallel to its axis, said tool rest further including a mounting sleeve in which said shank is telescoped, said sleeve having a key engaged in said keyway to establish a non-rotatable connection between said shank and said sleeve, and an adjusting screw threaded into the inner end of said shank and having a knob engaging the end of said sleeve, said sleeve being adapted to be mounted for both longitudinal and rotational adjustment in a supporting clamp, said knob having an annular indicator scale, and said sleeve having thereon an indicator mark cooperating with said scale to designate the degree of longitudinal adjustment of said shank in said sleeve.

References Cited in the file of this patent

UNITED STATES PATENTS

| 609,301 | Scull | Aug. 16, 1898 |
| 712,537 | Hisey | Nov. 4, 1902 |
| 1,694,074 | Martone | Dec. 4, 1928 |

FOREIGN PATENTS

| 23,761 | Great Britain | Dec. 29, 1900 |